Dec. 22, 1964   J. T. McNANEY   3,162,860
LIGHT RADIATION SENSITIVE VARIABLE RESISTANCE DEVICE
Filed Nov. 19, 1962   2 Sheets-Sheet 1
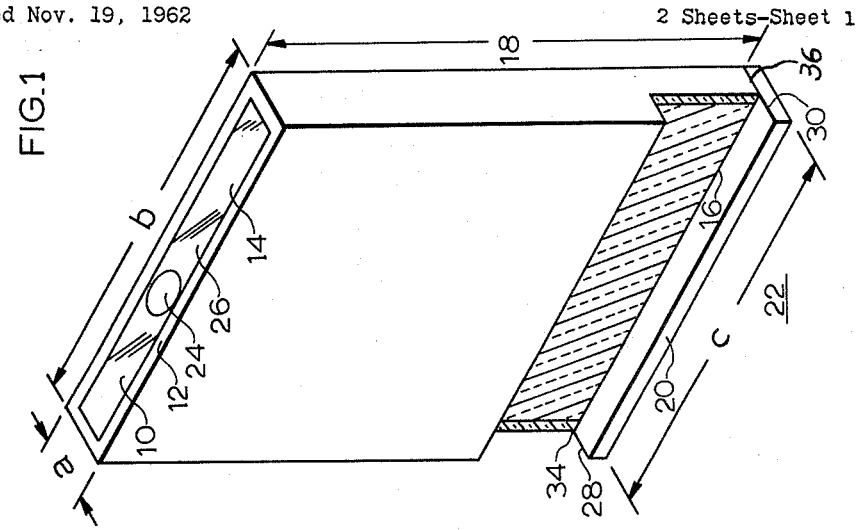
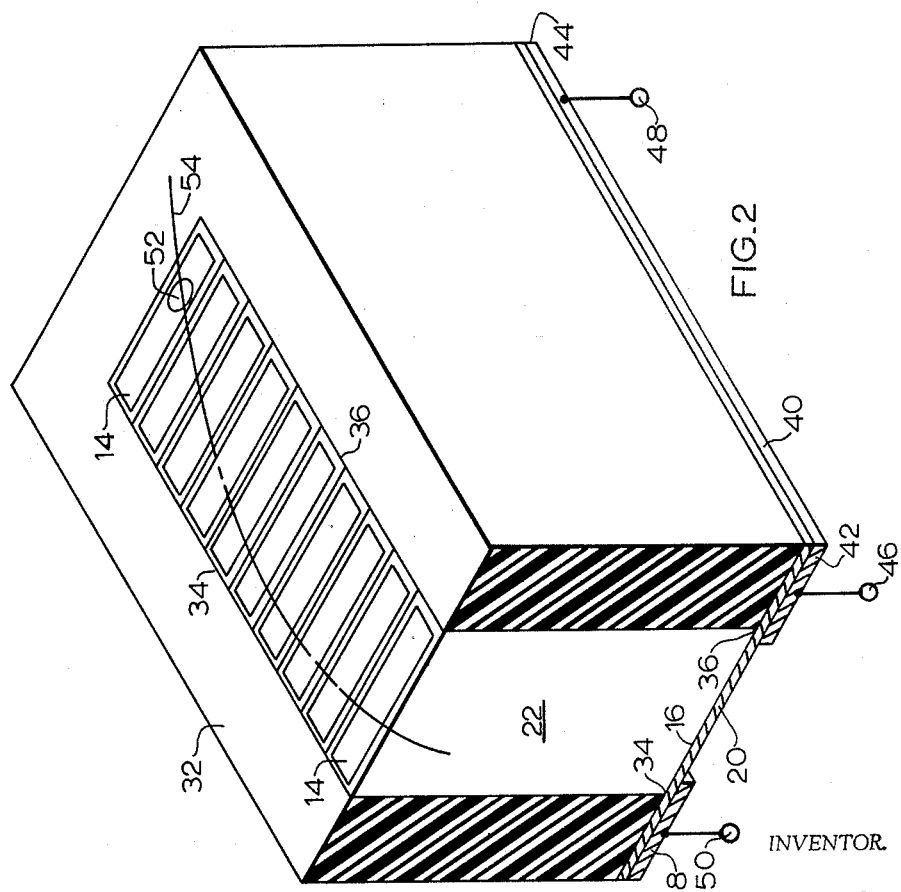
INVENTOR.
Joseph T. McNaney

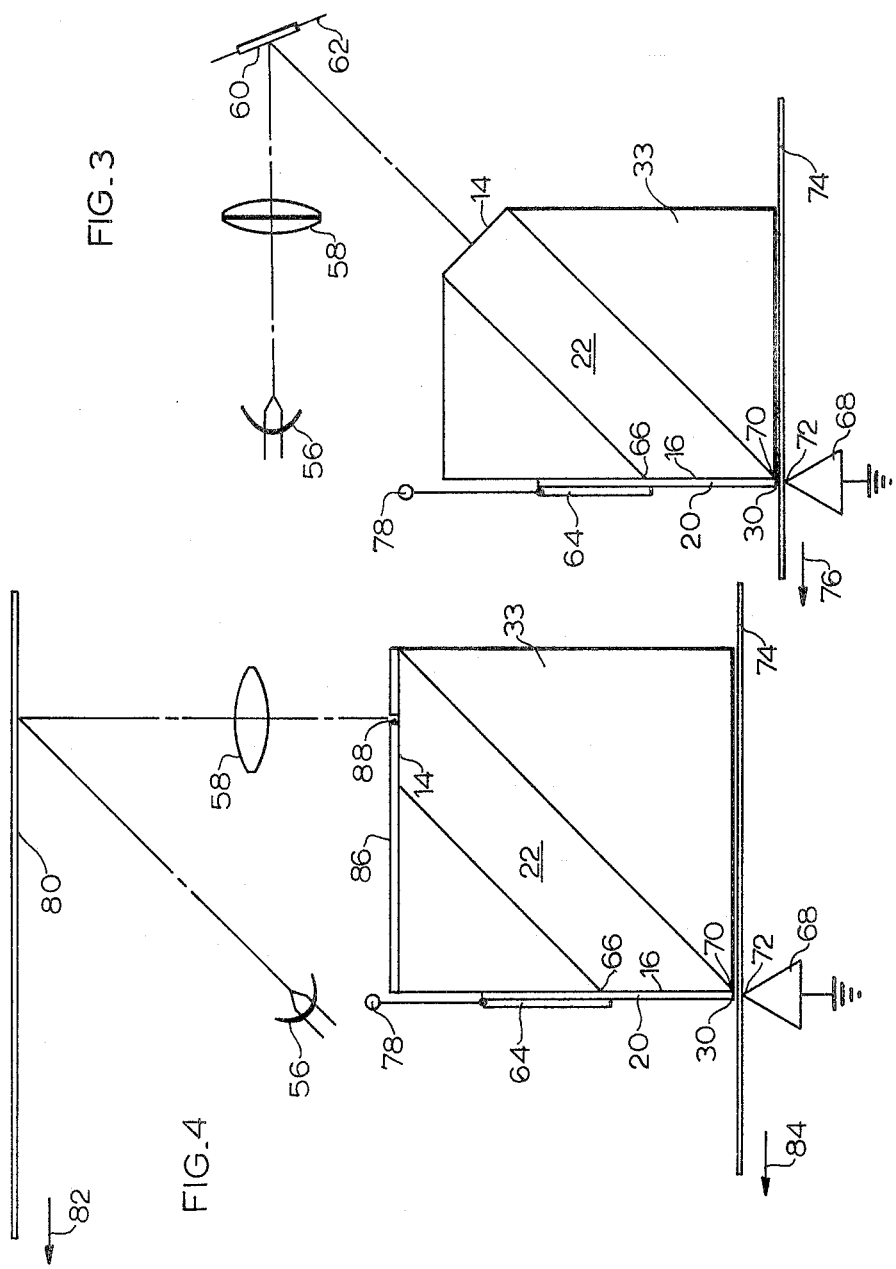

United States Patent Office 3,162,860
Patented Dec. 22, 1964

3,162,860
LIGHT RADIATION SENSITIVE VARIABLE
RESISTANCE DEVICE
Joseph T. McNaney, 8548 Boulder Drive,
La Mesa, Calif.
Filed Nov. 19, 1962, Ser. No. 238,359
10 Claims. (Cl. 346—74)

This invention relates to an improved light radiation sensitive variable resistance device capable of being utilized, for example, as a light-to-electron conversion device; in a light controlled potentiometer; in an oscillograph recorder; and also in an office copy apparatus.

The invention, in certain respects, is an improvement in a light-to-electron conversion device and recorder as described in my U.S. Patent No. 3,050,623. More particularly, the device of this invention is an improvement of a constrution capable of being utilized in place of the converter 40, shown in my aforestated patent.

In my improved light radiation sensitive variable resistance device I utilize a light conductor having a longitudinal dimension exceeding its cross sectional dimension, first and second ends presenting predetermined surface dimensions which are longer in one direction than in the other, whereby a longitudinally extending layer of photoconductor material may be supported by one end and illuminated by means of a predetermined-size light beam admitted through the opposite end. The light conductor is designed to have a predetermined index of refraction and is jacketed with a light conducting material having an index of refraction less than that of the light conductor for controlling the reflection of light through the light conductor and reflection of light to the layer of photoconductor material.

Jacketed light conductors of the type utilized in the aforestated patent and in the present invention are referred to in the arts as optical fibers and capable of being drawn down to extremely small cross sectional dimensions. Jacketed light conductors may, for example, be drawn down to diameters of 0.001". Light waves entering one end of the light conductor will be conducted to the opposite end after going through a series of internal light reflections; the jacket, of course, performing the necessary function of a light reflector. The light conductor is usually made of a flint glass which may have, as an example, an index of 1.80, and the jacket or light reflector may be of a crown glass having an index of 1.50. In the process of fabricating such an assembly, the jacket and the light conductor are drawn together in order to provide an extremely important fire-polished, contamination-free, interface between the two different materials.

The converter 40 of the invention described in Patent No. 3,050,623, referred to above, utilizes a plurality of such light conducting means to increase the density of the recorded information. Control voltage requirements on the other hand make it necessary to use a longitudinally extended layer of photoconductor material which may vary from 0.010" to 0.100" in length, depending of course upon a number of design factors, including record media, photoconductor materials, etc. The application of a longitudinally extending layer of photoconductor material to the uncoated portion of a relatively small diameter light conductor represents a solution insofar as information density and control voltage requirement are concerned. However, for certain applications of the light-to-electron converter principles embodied in the invention of the aforestated patent, it is an object of the present invention to provide a light radiation sensitive variable resistance device which is less expensive to fabricate in addition to being simple in construction, positive in operation, and trouble-free in continued use.

It is another object of this invention to utilize substantially rectangular in cross section jacketed light conductors which lend themselves to simplified means of support and alignment.

It is another object of the present invention to utilize the lengthwise dimension of the rectangularly shaped cross section to support a longitudinally extending layer of photoconductor material on an end surface of the light conductor.

It is another object of the present invention to utilize the width dimension of the rectangularly shaped cross section to meet the high density information requirements of the invention.

It is still another object of the present invention to utilize the lengthwise dimension of the rectangularly shaped cross section of the light receiving end of the light conductor to help compensate for irregularities in light beam deflections when used in an oscillograph recorder, or, light controlled potentiometer.

It is still a further object of the present invention to utilize the light shielding effects of an aperture mask adjacent the light receiving end of the light conductor to compensate for the lengthwise dimension of said end when used in office copy apparatus.

Other objects and advantages will appear hereniafter as a description of the invention proceeds.

The novel features that are considered characteristic of this invention are set forth with particularly in the appended claims. The invention itself, both as to its organization, and method of operation, as well as additional objects and advantages, will best be understood from the following description when read in connection with the accompanying drawings in which:

FIGURE 1 is a view in perspective, partially sectional, of a unitary device embodying the basis concepts of the invention;

FIGURE 2 is a view in perspective of a plurality of the devices referred to in FIGURE 1, to illustrate their utility in the construction of a light controlled potentiometer;

FIGURE 3 is a diagrammatic representation of a system embodiment of the invention in the form of an oscillograph recorder; and FIGURE 4 is a diagrammatic representation of another system embodiment of the invention in the form of an office copy apparatus.

Referring more particularly to the unitary device set forth in FIGURE 1, I have shown therein a first light conductor, or optical fiber 10, jacketed by a second light conductor, or, light reflector 12, extending from a first end 14 to a second end 16 along a longitudinal dimension of the fiber 10. The longitudinal dimension 18 exceeds the cross sectional dimension of the fiber 10 and the cross section of the fiber is substantially rectangular. For example, the longitudinal dimension of the fiber 10 may be one inch, more or less, while its cross section may have a lengthwise dimension of 0.010" and a width dimension of 0.001". The cross sectional dimensions of the fiber 10 and jacket 12 assembly is of the utmost importance to the invention since these dimensions are necessary in providing (1) a width dimension $a$ for meeting the high density information requirements of the invention, (2) a length dimension $b$ for compensating for possible irregularities in ligh* beam deflections and (3) a length dimension $b$ capable of providing end surface support means for the length dimension $c$ of a longitudinally extending layer of photoconductor material 20.

The fiber 10 of the device 22 described thus far is designed to have a predetermined index of refraction while the light conductor jacketing the fiber 10, and serving as the light reflector 12, has an index of refraction less than the predetermined index of the fiber 10.

A section of the fiber 10 and the light reflector 12, as shown in FIGURE 1, has been removed merely to aid in the description of the device 22. Therefore, it should be understood that the light reflector 12 is disposed upon and intimately joined with the entire outer surface of the fiber 10 extending from the first end 14 to the second end 16 along the longitudinal dimension 18 of the fiber 10. The light reflector 12 is adapted to provide the reflection of light through the fiber 10 from the first end 14 to the second end 16 and to the layer of photoconductor material 20. A predetermined-size light beam entering a limited area 24 of the elongated surface 26 of the first end 14 will be reflected through the fiber 10 and reflected uniformly over the surface area of the layer 20 intimately joined with the second end surface 16, extending from a first end 28 to a second end 30 of the layer 20. Upon illumination of the layer 20 it will be converted from a relatively high electrical resistance state along its $c$ dimension to a relatively low electrical resistance.

The photoconductor material 20 will be selected from a number of well known solids, such as selenium, cadmium sulphide, silicon, germanium, gallium, arsenide, or combinations of such materials, either in their pure state or in a modified state. The invention is not to be limited in this respect since there is a large number of materials from which one or more photoconductors may be selected and utilized in this invention.

As hereinbefore stated a plurality of the devices 22 as shown in FIGURE 1, can be placed side-by-side in the manner necessary to utilize the width dimension $a$ in meeting the high density or resolution capabilities of such an array, while retaining the advantages of the lengthwise dimension $b$. In the FIGURE 2 embodiment a plurality of devices 22 are aligned in a side-by-side adjacency within a support material 32, whereby the first edge 34 of the respective first and second ends 14 and 16 are aligned, and the second edge 36 of the respective first and second ends 14 and 16 are also aligned. When supported in this manner the plurality of devices 22 will be machined to provide smooth well aligned ends 14 and 16. A layer of photoconductor material 20 will then be disposed upon and intimately joined to the surfaces of ends 16, extending to or beyond the first and second edges 34 and 36. A first electrical conductor 38 is operatively connected to the layer 20 adjacent the first edge 34 of the second end 16 of the devices 22. A second electrical conductor 40 is operatively connected to the layer 20 adjacent the second edge 36 of the second end 16 of the devices 22 which is preferably an electrical resistance element, having a predetermined electrical resistance intermediate a first end 42 and a second end 44.

The embodiment of FIGURE 2 has been provided with a terminal 46 connected to the first end 42; a terminal 48 connected to the second end 44; and a terminal 50 connected to the first electrical conductor 38. A voltage may be connected between the terminals 46 and 48, and a voltage may be derived from the terminal 50 with respect to either terminal 46 or terminal 48 as a function of light incident to ends 14 of devices 22. If, as an example, the devices 22 have a width dimension $a$ of 0.001″ and supported on center-to-center spacings of 0.001″, and it is desirable to make use of the resolution capabilities of the 0.001″ dimension, it will be necessary to utilize a light beam not greater than 0.001″ and preferably of a circular cross section 52. A light beam of such dimensions may then be used to select any one of the devices 22 in the array and excite any one of the longitudinally dimensioned layers 20 associated therewith, rendering a one thousand bits-per-inch information density in the form of voltage on terminal 50.

One of the advantages of the length dimension $b$ is illustrated in FIGURE 2 by the use of a light beam deflection center line 54, drawn over the surfaces of the ends 14 of the devices 22. Although the assembly of devices 22 are not drawn to scale it can be assumed that their length dimension $b$ might be 0.010″, or possibly 0.100″. In the case of a 0.010″ length dimension it will be possible for a light beam to follow a path 54 which deviates from a perfect course as much as ten times the beam diameter, and in the event the length dimension is 0.100″ it will be possible for the light beam to follow a path 54 which deviates from a perfect course as much as one hundred times the beam diameter.

Another of the advantages of the length dimension $b$, of course, in connection with the second end 16 and a length dimension of 0.010″, is that a longitudinally extended layer 20 up to 0.010″ will be supported on the surface of the second end 16, and a length dimension $b$ of 0.100″ will be capable of supporting a longitudinally extending layer 20 up to 0.100″ on the surface of the second end 16 of the devices 22. The length of layer 20 and the type of photoconductor used will be directly related to the application requirements of the FIGURE 2 embodiment.

As hereinbefore stated, FIGURE 3 is a diagrammatic representation of an oscillograph recorder embodiment of the invention. As in the FIGURE 2 embodiment, it utilizes a plurality of devices 22 supported in a side-by-side adjacency within a support material 33, wherein the width dimension $a$ can be utilized in meeting the resolution requirements of such a recorder and the length dimension $b$ can be used in a manner of compensating for light beam deflection irregularities. A predetermined-size light beam is derived from a light source 56 and focused on the first ends 14 of an array of devices 22 through a lens system 58 and deflection mirror 60 which is capable of being rotated about an axis 62 for the purpose of deflecting the light beam with respect to the array of devices 22.

Light is reflected through the fiber of a selected device 22 of the array, from the first end 14 to the second end 16 to illuminate the longitudinally extended layer of photoconductor material 20, as described in connection with the device of FIGURE 1. In this embodiment, however, a first electrode 64 is operatively connected to the layer 20 adjacent the first edge 66 of the second end 16 of the plurality of devices 22. A second electrode 68, preferably wedge-shaped, is adjacent and spaced apart from the second edge 70 of the second end 16 of the devices 22. As hereinbefore stated, the layer 20 extends from the first edge 66 to the second edge 70 and is illuminated to the extent of its length by the predetermined-size light beam incident to the first end 14 of a selected device 22. Intermediate the second end 30 of the layer 20 and the thin edge 72 of the second electrode 68 and adjacent thereto, there is a record medium 74 capable of being moved in the direction of arrow 76. A voltage will be applied to a terminal 78 connected to the electrode 64, with respect to the second electrode 68 which is at an electrical ground. In the absence of light the voltage will be across the longitudinal dimension of the layer 20, but when the layer 20 is illuminated the voltage will appear between the second end 30 and the edge 72, thereby extending a potential influence across the spaced apart dimension and electrostatically polarizing the record medium. A recording of light input effects incident to the ends 14 of the devices 22 will, therefore, be established on the record medium 74 in the form of latent images which can thereafter be developed by any of a number of well known techniques.

Referring now to FIGURE 4, which is a diagrammatic representation of a system embodiment of the invention in the form of an office copy machine, wherein, a sheet 80 of data to be copied can be transferred to a record medium 74. In such a system the sheet 80 will be moved in the direction of arrow 82 simultaneously with the movement of the record medium 74 in the direction of arrow 84. Radiant energy from a source 56 can be used to illuminate the sheet 80 and a lens system 58 can be used to image the reflections on the surface of a mask 86. The mask 86 has an aperture 88 therein, extending the length of an array of devices 22. In accordance with the description of FIGURE 3, this embodiment also utilizes a plurality of devices 22 supported in a side-by-side adjacency within a support material 33, wherein the width dimension $a$ can be utilized in meeting the resolution requirements of this data copying system. However, the light shielding effects of the aperture mask 86 adjacent the light receiving ends 14 of the light conductors 10 of the devices 22 will compensate for the lengthwise dimension $b$ when the invention is incorporated in a data copying system, while retaining the other specified advantages of the invention.

A recording of light input effects incident to the ends 14 of the devices 22 will be established on the record medium 74, and developed, as stated in connection with the FIGURE 3 embodiment. In order to meet the high density information or resolution requirements of such a system the width dimension $a$ of the devices 22 can be 0.001″, and the width dimension of the aperture 88 can be 0.001″ or less. Upon the exposure of such predetermined-size light beams to the end 14 of a device 22, the light conductor 12 jacketing the fiber 10 will reflect the input light to the opposite end 16 and uniformly over the entire surface area of the longitudinally extending layer of photoconductor material 20, adjacent the second end 16.

It is preferable in this embodiment of the invention to support the layer 20 perpendicularly in its relation to the direction of travel of the record medium 74, as illustrated. It is also desirable from the standpoint of design flexibility not to be limited insofar as the orientation of the light conductors 10 is concerned. Therefore, as illustrated in FIGURES 3 and 4, the layer 20 can be supported on the end 16 surface of the devices 22 at an angle other than 90° with respect to the longitudinal dimension of the devices 22.

It should, of course, be understood that many of the other embodiments embracing the general principles and constructions hereinbefore set forth, may be utilized and still be within the ambit of the present invention.

The particular embodiments of the invention illustrated and described herein are illustrative only, and the invention includes such other modifications and equivalents as may readily appear to those skilled in the arts, and within the scope of the appended claims.

I claim:

1. Means for reflecting a predetermined-size light beam uniformly over a relatively large surface area of a photoconductor comprising:

(a) a light conductor having a predetermined index of refraction, an elongated cross sectional dimension, a longitudinal dimension exceeding said cross sectional dimension, and first and second ends each presenting elongated surfaces extending transversely in relation to said longitudinal dimension and having first and second edges;

(b) a longitudinally extending layer of photoconductor material, having first and second ends, disposed upon and intimately joined with the elongated surface of the second end of said light conductor extending from the first to the second edge thereof;

(c) said first end surface being adapted to receive light radiation incident to a predetermined portion of said first end surface; and (d) a light reflector means having an index of refraction less than said predetermined index jacketing said light conductor entirely along said longitudinal dimension for controlling the reflection of light through said light conductor and the reflection of light through said second end surface to illuminate said layer intimately joined therewith.

2. Means for reflecting a predetermined-size light beam uniformly over a relatively large surface area of a photoconductor comprising:

(a) a light conductor having a predetermined index of refraction, an elongated cross sectional dimension, a longitudinal dimension exceeding said cross sectional dimension, and first and second ends each presenting elongated surfaces extending transversely in relation to said longitudinal dimension and having first and second edges;

(b) a longitudinally extending layer of photoconductor material, having first and second ends, disposed upon and intimately joined with the elongated surface of the second end of said light conductor extending from the first to the second edge thereof;

(c) said first end surface being adapted to accept light radiation within a predetermined area of said elongated dimensioned surface;

(d) a light reflector means having an index of refraction less than said predetermined index intimately joined with said light conductor entirely along said longitudinal dimension for controlling the reflection of light through said light conductor and reflection of light through said oblong surface of said second end to said layer intimately joined therewith.

3. A light radiation sensitive variable resistance device comprising:

(a) a light conductor having a predetermined index of refraction, an elongated cross sectional dimension, a longitudinal dimension exceeding said cross sectional dimension, and first and second ends each presenting elongated surfaces extending transversely in relation to said longitudinal dimension and having first and second edges;

(b) a longitudinally extending layer of photoconductor material, having first and second ends, disposed upon and intimately joined with the elongated surface of the second end of said light conductor extending from the first to the second edge thereof;

(c) said layer presenting a predetermined electrical resistance, in its dark state, intermediate the first and second ends thereof;

(d) means for admitting a predetermined-size light beam to a predetermined area of the elongated surface of the first end of said first light conductor;

(e) a second light conductor having an index of refraction less than said predetermined index intimately joined with said first light conductor entirely along the longitudinal dimension extending from the first end to the second end thereof; and (f) said second light conductor being adapted to provide reflection of light through said first light conductor and to said layer for modifying said predetermined electrical resistance intermediate the first and second ends of said layer.

4. A light radiation sensitive variable resistance device comprising:

(a) a first light conductor having a predetermined index of refraction, an elongated cross sectional dimension, a longitudinal dimension exceeding its cross sectional dimension, and first and second ends each presenting elongated surfaces extending transversely in relation to said longitudinal dimension;

(b) a longitudinally extending layer of photoconductor material, having first and second ends, elongated dimensions equal to said cross sectional dimensions disposed upon and intimately joined with the elongated surface of the second end of said first light conductor extending crosswise of said longitudinal dimension;

(c) said layer presenting a high electrical resistance, in its dark state, intermediate the first and second ends thereof;

(d) means for presenting the influence of an electrical potential between the first and second ends of said layer;
(e) means for exposing a predetermined area of the elongated surface of the first end of said first light conductor to light;
(f) a second light conductor having an index of refraction less than said predetermined index intimately joined with said first light conductor along the longitudinal dimension extending entirely from the first end to the second end thereof;
(g) said second light conductor being adapted to provide the reflection of light through said first light conductor from said first to said second end, and the reflection of light to said layer; and
(h) means for deriving a flow of electrons from said electrical potential upon the reflection of light from said second light conductor to said layer.

5. Means for utilization in a light radiation sensitive variable resistance apparatus comprising:
(a) a plurality of light conductors each having a predetermined index of refraction, an elongated cross sectional dimension, a longitudinal dimension exceeding said cross sectional dimension, and first and second ends each presenting elongated surfaces extending transversely in relation to said longitudinal dimension and having first and second edges;
(b) a longitudinally extending layer of photoconductor material, having first and second ends, disposed upon and intimately joined with the elongated surface of the second end of each of said light conductors extending from the first to the second edge thereof;
(c) said first end surface of each of said light conductors being adapted to admit a predetermined-size light beam to a predetermined area of said elongated surface; and
(d) a light reflector means having an index of refraction less than said predetermined index intimately joined with each of said light conductors entirely along said longitudinal dimension for controlling the reflection of light through said light conductor and reflection of light through the second end thereof to said layer intimately joined therewith.

6. Means for utilization in a light radiation sensitive variable resistance device comprising:
(a) a plurality of first light conductors each having a predetermined index of refraction, an elongated cross sectional dimension, a longitudinal dimension exceeding said cross sectional dimension, and first and second ends each presenting elongated surfaces extending transversely in relation to said longitudinal dimension and having first and second edges;
(b) a longitudinally extending layer of photoconductor material, having first and second ends, disposed upon and intimately joined with the elongated surface of the second end of each of said light conductors extending from the first to the second edge thereof;
(c) said layer presenting a predetermined electrical resistance, in its dark state, intermediate the first and second ends thereof;
(d) means for presenting light to the first end of said first light conductors within predetermined limits of the elongated surface dimension thereof;
(e) a second light conductor having an index of refraction less than said predetermined index intimately joined with and surrounding said first light conductors entirely along the longitudinal dimension thereof extending from the first end to the second end thereof; and
(f) said second light conductor being adapted to provide reflection of light through said first light conductors to said layer for modifying said predetermined electrical resistance intermediate the first and second ends of said layer.

7. Means for utilization in a light radiation sensitive variable resistance device comprising:
(a) a plurality of first light conductors each having a predetermined index of refraction, an elongated cross sectional dimension, a longitudinal dimension exceeding its cross sectional dimension, a first end presenting an elongated surface dimension equal to said cross sectional dimension and transverse of said longitudinal dimension, and a second end presenting an elongated surface dimension equal to said cross sectional dimension and transverse of said longitudinal dimension having first and second edges;
(b) a longitudinally extending layer of photoconductor material, having first and second ends, disposed upon and intimately joined with the second end of each of said first light conductors extending from the first to the second edge thereof;
(c) said layer presenting a predetermined electrical resistance, in its dark state, intermediate the first and second ends thereof;
(d) means for presenting the influence of an electrical potential between the first and second ends of said layer;
(e) means for exposing a predetermined area of the elongated surface of the first end of each of said first light conductors to light;
(f) a second light conductor having an index of refraction less than said predetermined index intimately jacketing said first light conductors so as to surround said first light conductors entirely along their respective longitudinal dimensions extending from their respective first ends to the second ends thereof; and
(g) said second light conductor being adapted to provide the reflection of light through said first light conductor and the reflection of light to said layer for deriving a flow of electrons from said electrical potential.

8. A light radiation sensitive variable resistance device comprising:
(a) a plurality of first light conductors each having a predetermined index of refraction, an elongated cross sectional dimension, a longitudinal dimension exceeding its cross sectional dimension, first and second ends presenting elongated surface dimensions substantially equal to said cross sectional dimension and transverse of said longitudinal dimension having first and second edges, and supported in a side-by-side relationship to provide an alignment of respective first and second edges and first and second ends;
(b) a layer of photoconductor material disposed upon and intimately joined with the second ends of said first light conductors extending from the first edge to the second edge thereof;
(c) said layer presenting a predetermined electrical resistance, in its dark state, intermediate the first and second edges of the second ends of said first light conductors;
(d) a first electrical conductor operatively connected to said layer adjacent the first edge of the second end of said first light conductors;
(e) a second electrical conductor having first and second ends and a predetermined electrical resistance intermediate the ends thereof operatively connected to said layer adjacent the second edge of the second end of said first light conductor;
(f) means for admitting light selectively to the first ends of said first light conductors within predetermined areas of said elongated surface dimensions;
(g) a second light conductor having an index of refraction less than said predetermined index intimately jacketing said first light conductors so as to surround said first light conductors entirely along the longitudinal dimension thereof extending from the first end to the second end thereof; and
(h) said second light conductor being adapted to provide reflection of light through said first light conductors to said layer for modifying said predetermined electrical resistance between said first electrical conductor and said second electrical conductor.

9. Means for utilization in a recording apparatus comprising:
   (a) a plurality of light conductors each having a predetermined index of refraction, an elongated cross sectional dimension, a longitudinal dimension exceeding its cross sectional dimension, first and second ends presenting elongated surface dimensions substantially equal to said cross sectional dimension and transverse of said longitudinal dimension having first and second edges, and supported in a side-by-side adjacency to provide an alignment of the ends of said light conductors and the first and second edges thereof;
   (b) a layer of photoconductor material disposed upon and intimately joined with the second ends of said light conductors extending from the first edge to the second edge thereof;
   (c) said layer presenting a predetermined electrical resistance, in its dark state, intermediate said first and second edges;
   (d) a first electrode operatively connected to said layer adjacent the first edge of the second end of said light conductor;
   (e) a second electrode adjacent and spaced apart from the second edge of the second end of said light conductor;
   (f) means for presenting the influence of an electrical potential between said first and second electrodes;
   (g) aperture means adjacent said first end of said light conductor for limiting the exposure of light thereto;
   (h) light reflector means having an index of refraction less than said predetermined index jacketing said light conductors so as to surround said conductors entirely extending from the first end to the second end along the longitudinal dimension thereof for controlling the reflection of light through said light conductor and reflection of light to said layer for modifying said predetermined electrical resistance and for deriving a flow of electrons from said electrical potential.

10. Means for utilization in a recording apparatus comprising:
   (a) a longitudinally extending layer of photoconductor material having first and second ends and a predetermined electrical resistance, in its dark state, intermediate its first and second ends;
   (b) means for presenting the influence of an electrical potential across a longitudinal dimension of said photoconductor in said dark state;
   (c) means for supporting a record medium adjacent said second end;
   (d) a first light conductor means for supporting said layer and for conducting light to said layer uniformly intermediate said first and second ends;
   (e) said first light conductor means having a predetermined index of refraction, an elongated cross sectional dimension, a longitudinal dimension exceeding its cross sectional dimension, and presenting first and second end surfaces each having a lengthwise dimension greater than its width dimension running crosswise with respect to said longitudinal dimension;
   (f) said layer being intimately joined with said second end surface whereby said longitudinal dimension of said layer coincides with said lengthwise dimension of said second end surface and thereby disposed transversely of said longitudinal dimension;
   (g) aperture limiting means adjacent said first end surface for controlling the area dimesions of light admitted thereto;
   (h) a second light conductor means having an index of refraction less than said predetermined index intimately joined with and surrounding said first light conductor means entirely extending from said first end surface to said second end surface for controlling the reflection of light from said aperture limiting means through said first light conductor means and the reflection of light to said layer for modifying said predetermined electrical resistance and extending the influence of said electrical potential to said record medium.

References Cited in the file of this patent
UNITED STATES PATENTS

| | | |
|---|---|---|
| 2,196,867 | Knoop | Apr. 9, 1940 |
| 2,898,468 | McNaney | Aug. 4, 1959 |
| 3,024,079 | Salvatori et al. | Mar. 6, 1962 |
| 3,050,623 | McNaney | Aug. 21, 1962 |
| 3,086,113 | McNaney | Apr. 16, 1963 |